(12) United States Patent  (10) Patent No.: US 9,229,610 B2
Lu et al.  (45) Date of Patent: Jan. 5, 2016

(54) METHODS AND SYSTEMS FOR VISUALLY FORMING RELATIONSHIPS BETWEEN ELECTRONIC CONTENT

(71) Applicant: Adobe Systems Incorporated, San Jose, CA (US)

(72) Inventors: Phil Lu, Burlingame, CA (US); Graeme Mott, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 620 days.

(21) Appl. No.: 13/644,204

(22) Filed: Oct. 3, 2012

(65) Prior Publication Data

US 2014/0096088 A1  Apr. 3, 2014

(51) Int. Cl.
*G06F 3/0481* (2013.01)
*G06F 17/30* (2006.01)

(52) U.S. Cl.
CPC ........ *G06F 3/0481* (2013.01); *G06F 17/30572* (2013.01)

(58) Field of Classification Search
CPC .................................................... G06F 3/0481
USPC ......................................................... 715/853
See application file for complete search history.

(56) References Cited

U.S. PATENT DOCUMENTS

| 7,398,004 B1* | 7/2008 | Maffezzoni .......... G11B 27/034 386/282 |
| 8,352,465 B1* | 1/2013 | Jing .................. G06F 17/30867 707/723 |
| 8,539,342 B1* | 9/2013 | Lewis ................... G06F 17/212 715/243 |
| 2003/0101164 A1* | 5/2003 | Pic ..................... G06F 17/30017 |
| 2012/0102392 A1* | 4/2012 | Reesman .......... G06F 17/30905 715/243 |
| 2013/0266215 A1* | 10/2013 | Brookhart ................ G06K 9/00 382/162 |
| 2013/0275359 A1* | 10/2013 | Sweeney ........... G06F 17/30705 706/55 |

* cited by examiner

*Primary Examiner* — Anil Bhargava
(74) *Attorney, Agent, or Firm* — Kilpatrick Townsend & Stockton LLP

(57) ABSTRACT

Methods and systems are discussed for visually forming relationships between electronic content. Electronic content from a computing device may be received. The electronic content may be displayed on a graphical user interface. The received electronic content may be analyzed to identify characteristics of the electronic content. The received electronic content may be visually related to previously received electronic content on a graphical user interface. The received and the previously received electronic content may be visually related by applying a relationship hierarchy to the identified characteristics.

18 Claims, 6 Drawing Sheets

METHODS AND SYSTEMS FOR VISUALLY FORMING RELATIONSHIPS BETWEEN ELECTRONIC CONTENT

FIELD

This disclosure relates generally to analyzing and organizing electronic content. In particular, the present invention relates to visually forming relationships between electronic content.

BACKGROUND

Traditional methods of organizing electronic content generally require an individual to view and manually group electronic content with other electronic content that may be similar. For example, to group photographs, an individual would manually review photographs and group the photographs based on personal criteria. The individual may decide to manually group photographs in a folder if they were taken on the same day or at the same location. However, there is no adequate mechanism to quickly and efficiently visually relate and organize electronic content based on identified characteristics of the electronic content. Further, there is not an adequate mechanism to visually relate and organize electronic content by applying a relationship hierarchy to identified characteristics of the electronic content. To that end, existing methods and applications that allow a user to visually organize electronic content are limited with respect to their intuitiveness and/or capabilities.

SUMMARY

Embodiments according to the present disclosure provide methods and systems for visually forming relationships between electronic content. For example, one disclosed embodiment is a method comprising receiving electronic content from a computing device, the received electronic content being displayed on a graphical user interface; analyzing the received electronic content to identify characteristics of the received electronic content; and visually relating on the graphical user interface the received electronic content to previously received electronic content by applying a relationship hierarchy to the identified characteristics. In another embodiment, a computer-readable medium comprises program code for causing one or more processors to execute such a method.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
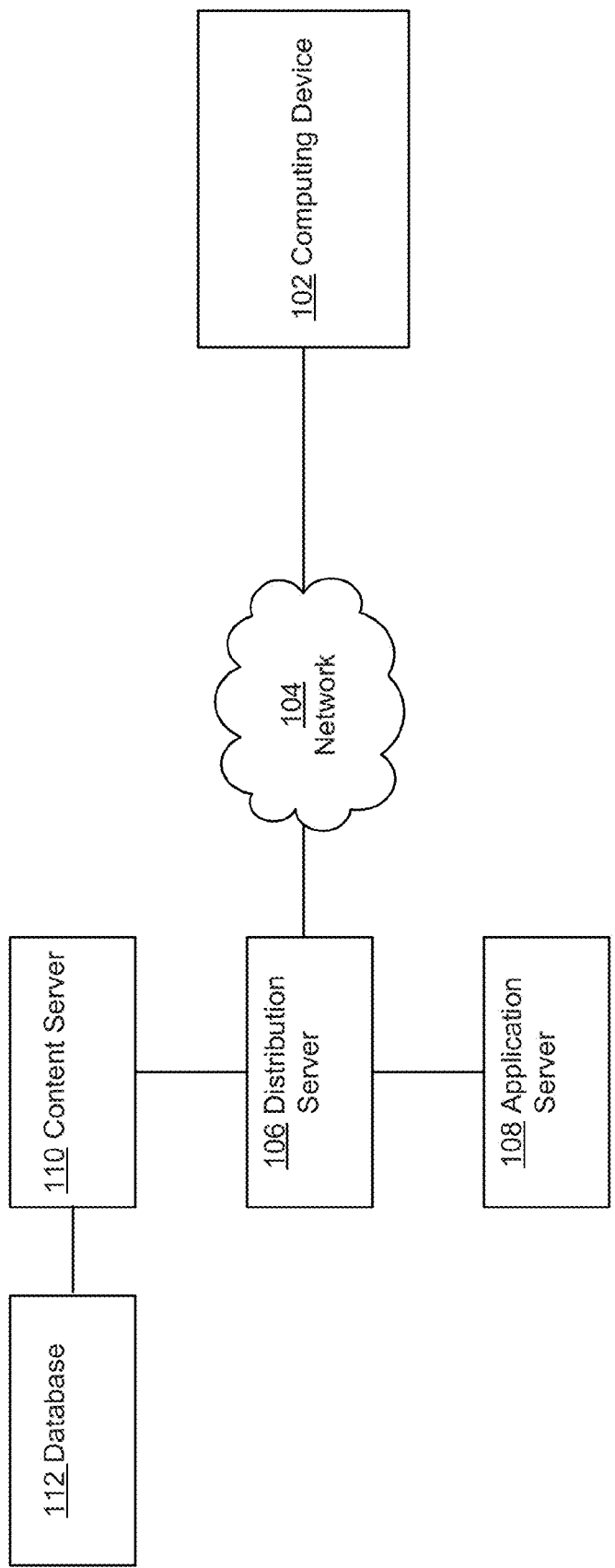
FIG. 1 is a block diagram depicting an exemplary system for implementing visually forming relationships between electronic content.

Systems and methods are disclosed to facilitate the visual formation of relationships between electronic content. The methods and systems disclosed herein may be used in a variety of contexts and provide various advantages and features. To illustrate certain features and advantages the following discussion describes an embodiment in which relationships are visually formed between electronic content displayed on a graphical user interface by using a relationship hierarchy. However, it will be understood by those of skill in this art that the methods and techniques may be used in other circumstances and may be modified and adjusted as appropriate to address the particular requirements presented by those circumstances.

In one exemplary embodiment, systems and methods for visually forming relationships between electronic content provide an automated and efficient way to visually organize or group electronic content on a graphical user interface. The visual forming of relationships between electronic content occurs by automatically visually relating the electronic content. Visually relating electronic content may include, but not be limited to, forming a visual connection by positioning or placing electronic content in the same location, merging electronic content, grouping electronic content under a general category, and the like. Visually relating electronic content may also include linking or connecting electronic content by using a line, dot or some other mechanism to illustrate connection between electronic content.

Electronic content may be provided by a user of a computing device to be displayed on a graphical user interface. The received electronic content can be analyzed to identify characteristics of the electronic content and the received electronic content can be visually related to previously received electronic content on the graphical user interface by applying a relationship hierarchy to the identified characteristics of the received electronic content. The visually related electronic content may be organized to be viewed by a graphical user interface of one or more computing devices. This may enable users of one or more computing device to collaborate and have electronic content provided by any user to be organized for efficiency. This is an improvement over more conventional forms of visually forming relationships between electronic content. Conventional forms of visually forming relationships between electronic content requires an individual to view and manually group electronic content with other electronic content that may be similar.

In some embodiments, systems and methods for visually forming relationships between electronic content permits users of one or more computing device to simultaneously interact through a graphical user interface of their respective computing devices and visually relates electronic content provided by the users during their interaction. For example, a user of a computing device may upload electronic content, such as a photograph, to a software application that displays the graphical user interface on the computing device. The uploaded photograph may be displayed on the graphical user interface and automatically visually related or connected to other electronic content already positioned on the graphical user interface based on a relationship hierarchy. A user of another computing device running the same software application on their graphical user interface may simultaneously observe the uploaded photograph and the visual relation of the photograph to other electronic content. A user of another computing device may upload or enter electronic content, such as text, on the graphical user interface of the software application and that text may be visually related with other electronic content based on a relationship hierarchy. In the example, the users of the computing devices are able to simultaneously observe the electronic content being uploaded or placed on the graphical user interface and being visually related to the other electronic content.

Various embodiments of systems and methods for visually forming relationships between electronic content provides an environment where electronic content can be received, displayed on a graphical user interface and visually related to previously received electronic content. The received electronic content can be visually related and organized to be viewed on the graphical user interface of one or more computing devices. The term "electronic content" is used generally herein to refer text, images, drawings, photographs, audio, videos, multimedia messages, and the like. Electronic content is generally received and displayed on a computing device (collectively referred to herein as a "computing device").

The received electronic content may have one or more identified characteristics. The received electronic content is visually related to previously received electronic content by applying a relationship hierarchy to identified characteristics of the electronic content. The term "identified characteristics" is used generally herein to refer to at least one of a rating, a manual grouping, metadata associated with the electronic content, location of the electronic content on the graphical user interface, time at which the electronic content is received, the type of electronic content, and other characteristics of electronic content. The identified characteristics may be provided by the user of a computing device. In some embodiments, the identified characteristics may be provided by a software application executed on the computing device. In another embodiment, the identified characteristics may be inherently included within the electronic content. In some embodiments, the identified characteristics may be provided by a user of one or more computing devices.

The term "relationship hierarchy" is used generally herein to refer to a ranking of one or more identified characteristics, and the like. The relationship hierarchy may be defined by the user of the computing device. For example, the user of the computing device may define that the time in which the electronic content was placed on the graphical user interface has a higher ranking than the location of the electronic content on the graphical user interface. In this example, the application of the relationship hierarchy to the identified characteristics of the electronic content may visually relate electronic content placed on the graphical user interface around a similar time or time interval before visually relating electronic content around a similar location on the graphical user interface. The result may be that electronic content placed on the graphical user interface around a similar time or time interval may be visually related or organized on a graphical user interface.

In another example, the user of the computing device may define that a rating of electronic content by a user of a computing device has a higher ranking than the time in which the electronic content was placed on the graphical user interface and the location of the electronic content on the graphical user interface. In this example, the application of the relationship hierarchy to the identified characteristics of the electronic content may visually relate electronic content rated higher by a user of a computing device before considering the time in which the electronic content was placed on the graphical user interface or the location of the electronic content on the graphical user interface. In a further example, the user of the computing device may define that a manual grouping of electronic content has a higher ranking than a rating of the electronic content by a user of a computing device. In this example, electronic content being manually groups will take precedence over a rating of electronic content. In this example, the application of the relationship hierarchy to the identified characteristics of the electronic content may visually relate manually grouped electronic content before considering a rating of electronic content on the graphical user interface. In some embodiments, the relationship hierarchy may be defined by a software application executed on the computing device. The relationship hierarchy may be defined in any manner.

In some embodiments, systems and methods for visually forming relationships between electronic content may use at least computing device technology, internet-based technology, cloud computing technology, network server technology, and software executable applications. In some embodiments, the user may interact with an application (referred to herein as a "content relationship application") to provide electronic content to be displayed on the graphical user interface. The user may also interface with the content relationship application to view the received electronic content and previously received electronic content on the graphical user interface. The software executable instructions of the content relationship application may be used to generate the graphical user interface. The user may interface with the content relationship application to provide one or more identified characteristics of the electronic content. The user may interface with the content relationship application to define a hierarchy relationship. The user may interface with the content relationship application to provide electronic content to be displayed on a graphical user interface.

The content relationship application may receive electronic content from the user of the computing device. The content relationship application may analyze the received electronic content to identify one or more characteristics of the electronic content. For example, the content relationship application may analyze the received electronic content to identify metadata associated with the electronic content. In some embodiments, the content relationship application may extract the identified characteristics from the received electronic content. In an example, the content relationship application may extract information related to electronic content containing an image and text. The content relationship application may visually relate the received electronic content to previously received electronic content by applying a relationship hierarchy to the identified characteristics of the received electronic content. The visual relation of the electronic content may be displayed on the graphical user interface. In some embodiments, the electronic content is visually related on one or more computing devices. For example, a photograph may be visually related or organized with other electronic content on a graphical user interface of a user of a computing device and another individual using a different computing device.

The visual relation of the electronic content may be simultaneous. The simultaneous visual relation of the electronic content may permit the users of one or more computing devices to collaborate and work from a graphical user interface having the same or similar electronic content.

The content relationship application may incorporate computing logic functionality, interactive functionality, collaboration functionality, graphical user interface functionality, electronic content manipulation functionality, typing functionality, electronic content insertion functionality, and many other similar features. The content relationship application runs on one or more computing devices. However, it is possible that the content relationship application may be run on another device, such as a mobile device, tablet device, a network server, and the like.

In some embodiments, the electronic content may be received by the user of a computing device. The user of the computing device may provide the electronic content and the electronic content may be stored on a cloud computing server. For example, the user may interact with a graphical user interface to provide a photograph to be displayed. The photograph may be stored on a cloud computing server. Previously received content may also be stored on a cloud computing server. Electronic content provided by a user of one or more computing devices may be stored on a cloud computing server. Any electronic content displayed can be stored on a cloud computing server.

These illustrative examples are given to introduce the reader to the general subject matter discussed here and are not intended to limit the scope of the disclosed concepts. The following sections describe various additional embodiments and examples with reference to the drawings in which like numerals indicate like elements.

Illustrative Devices and Systems

Referring now to the drawings in which like numerals indicate like elements throughout the several Figures, FIG. 1 is a block diagram depicting an exemplary system 100 for implementing visually forming relationships between electronic content. The exemplary system 100 may include a computing device 102 that is in communication with one or more network servers (e.g., distribution server 106, application server 108, content server 110) through a network 104. The network 104 may be an Internet, a Local Area Network (LAN), a Wide Area Network (WAN), a private network, a Wi-Fi, or some other suitable type of network associated topology.

The computing device 102 is associated with a particular user. The computing device generally includes a display that permits a user to view a graphical user interface. The user may use the display to interact with the graphical user interface. The user may use the user interface to interface with a content relationship application that visually relates the received electronic content with previously received electronic content. Various types of computing devices 102 may be used. As used herein, the term "computing device" refers to any computing or other electronic equipment that executes instructions and includes any type of processor based equipment that operates an operating system or otherwise executes instructions. A computing device will typically include a processor that executes program instructions and may include external or internal components such as a mouse, a CD-ROM, DVD, a keyboard, a display, or other input or output equipment. Examples of computing devices are personal computers, touchscreen devices, digital assistants, personal digital assistants, cellular phones, mobile phones, smart phones, pagers, digital tablets, laptop computers, Internet appliances, other processor-based devices, and television viewing devices. Exemplary computing device 102 is used as a special purpose computing device to provide specific functionality offered by its applications and by the interaction between its applications.

The one or more networks servers (e.g., distribution server 106, application server 108, content server 110) may be implemented using hardware, software, firmware, manual processing, or any combination thereof. Visually forming relationships between electronic content may be implemented through one or more software modules executed by the one or more network servers, possibly in cooperation with one or more content relationship applications executed by a computing device 102.

The distribution server 106 may be connected to the application server 108, and content server 110. These various servers may participate in a cloud computing paradigm. These various servers may be implemented on a single computer system, or multiple computer systems. The distribution server 106 may receive information from the computing device 102 and route the information to one or more of the servers 108 and 110. In addition, the distribution server 106 may distribute information received from one or more of the servers 108 and 110 to the computing device 102. In some embodiments, the distribution server 106 may receive information from the one or more computing devices and route the information to the one or more servers. The distribution server 106 may also distribute information received from the one or more servers to one or more computing devices.

The content server 110 may receive electronic content and/or other information from the computing device 102 over the network 104. The content server 110 may receive the electronic content from the distribution server 106 which received the electronic content from the computing device 102. The content server 110 may provide the electronic content and/or other information to one or more computing devices. For example, the content server 110 may provide a photograph received from the computing device 102 to one or more computing devices. In this example, the photograph may be viewed on a graphical user interface of the one or more computing devices. The content server 110 may receive electronic content from one or more computing devices. The electronic content may be provided to the content server 110 by the user of the computing device 102 or another computing device.

The content server 110 may also receive one or more identified characteristics of the electronic content. For example, the content server 110 may receive metadata associated with the electronic content. The content server 110 may receive a relationship hierarchy. The relationship hierarchy may be received from the user of the computing device 102 and/or a user of another computing device. The relationship hierarchy may be received from the application server 108. The content server 110 may receive electronic content that is visually related to previously received electronic content. The electronic content may be electronically stored on the computing device 102. In some embodiments, the distribution server 106 may receive electronic content from the content server 110 and provide the electronic content to one or more computing devices. The electronic content may be shared with one or more computing devices in a variety of ways.

The electronic content may be stored on the content server 110. The electronic content may be stored in the local memory of the content server 110, which may include a RAM, hard disk, removable disks, tape arrays, or any other computer readable medium. Alternatively, or additionally, the content server 110 may have a database 112 for storing at electronic content and/or other data. The content server 110 may store electronic content received from the user of the computing device 102.

The application server 108 may communicate with one or more servers to obtain received electronic content. The application server 108 may communicate with one or more servers to obtain previously received electronic content. The application server 108 may communicate with the computing device 102 and/or one or more computing devices to obtain received electronic content and/or previously received electronic content.

The application server 108 may analyze the received electronic content to identify one or more characteristics of the received electronic content. For example, the application server 108 may analyze electronic content to identify that the electronic content contains text. The application server 108 may analyze the text to determine the words used within with text. In another example, the application server 108 may analyze electronic content to identify that the electronic content is located in a particular position on the graphical user interface. The application server 108 may obtain the identified characteristics from the received electronic content. The application server 108 may use the identified characteristics to visually relate received electronic content with previously received electronic content. The application server 108 may visually relate the received electronic content to previously received electronic content by applying a relationship hierarchy to the identified characteristics of the received electronic content. The application server 108 may visually relate the received electronic content to previously received electronic content such that the visually related electronic content is displayed on a graphical user interface of one or more computing devices simultaneously.

The application server 108 may receive a relationship hierarchy. The application server 108 may receive the relationship hierarchy from the user of the computing device. The application server 108 may receive the relationship hierarchy from one or more users of one or more computing devices. The application server 108 may receive the application hierarchy from a software application executed on one or more computing devices. In some embodiments, the application server 108 may generate the relationship hierarchy. As discussed above, the relationship hierarchy may be used to rank identified characteristics. The rank of the identified characteristics may determine how received electronic content may be visually related to previously received electronic content. For example, the relationship hierarchy may determine that the identified characteristic of the location of the electronic content may have a higher rank than the time in which the electronic content was received by a computing device. In this example, the location of a photograph in relation to other electronic content on the graphical user interface will be more important than the time in which the photograph is placed on the graphical user interface.

The one or more servers 106, 108 and 110 and/or the computing device 102 may comprise a computer-readable medium such as a random access memory (RAM) coupled to a processor that executes computer-executable program instructions and/or accesses information stored in memory. Such a processor may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

Figure 2:
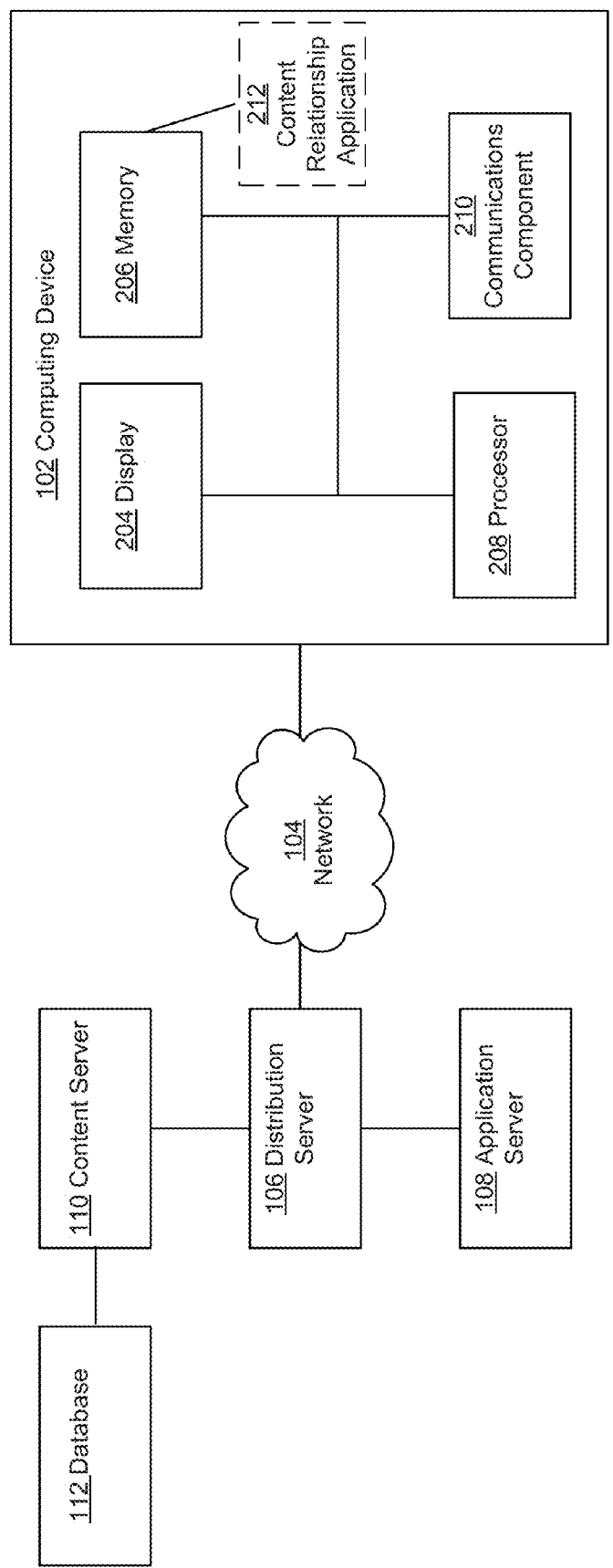
FIG. 2 is a block diagram depicting an exemplary system for implementing visually forming relationships between electronic content.

FIG. 2 is a block diagram depicting an exemplary system 200 for implementing forming visual relationships between electronic content. The exemplary system 200 illustrates details of the computing device 102. The computing device 102 may include a display 204, a memory 206, a processor 208 and a communications component 210.

The processor 208 may communicate with the display 204, memory component 206, and communications component 210. The processor 208 may process data and execute any of a software module or an executable software program, and cause data to be stored. The operation of the processor 208 may include executing software or coded instructions that may be associated with the one or more function modules.

The processor 208 may run an executable application. The executable application may be the content relationship application 212. The content relationship application 212 may be used to receive electronic content from the user of the computing device 102. The content relationship application 212 may be used to receive electronic content from users of one or more computing devices. The received content may be displayed on a user interface of the display 204. The content relationship application 212 may be used to analyze received electronic content to identity one or more characteristics of the received electronic content. The content relationship application 212 may be used to receive one or more identified characteristics. The content relationship application 212 may be used to extract identified characteristics from received electronic content.

The content relationship application 212 may be used to visually relate received electronic content to previously received electronic content on a user interface of the display 204. For example, the content relationship application may visually group a picture of the Eiffel Tower with other pictures of the Eiffel Tower on the user interface. The content relationship application 212 may visually relate the electronic content by applying a relationship hierarchy to one or more identified characteristics. The content relationship application 212 may be used to receive the relationship hierarchy from one or more users of one or more computing devices. The content relationship application 212 may be used to generate the relationship hierarchy. The content relationship application 212 may be used to visually relate electronic content on a user interface of the display 204 simultaneously on one or more computing devices.

The content relationship application 212 may function to provide the content on a user interface. The content relationship application 212 may receive commands from the user interacting with the user interface of the computing device 102. The content relationship application 212 may initiate and/or communicate a command from the computing device user to operate the appropriate component. The content relationship application 212 may perform some, none, or all of the functions of the computing device 102.

The display 204 may be used to view electronic content and/or other information. The display 204 may have a graphical user interface that may also be used to view electronic content. The memory 206 may be coupled to the processor 208 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. In some embodiments, electronic content may be stored on the memory 206. The memory 206 may store the content relationship application 212.

The communications component 210 may be connected to the display 204, memory component 206, and processor 208. The communications component 210 may receive information from the display 204, memory component 206, and processor 208 and route the information to one or more of the servers 106, 108 and 110. In addition, the communications component 210 may receive information from the one or more servers 106, 108 and 110 and route the information to the display 204, memory component 206, and processor 208. The communications component 210 may receive information from the display 204, memory component 206, and processor 208 and route the information to one or more computing devices.

Figure 3:
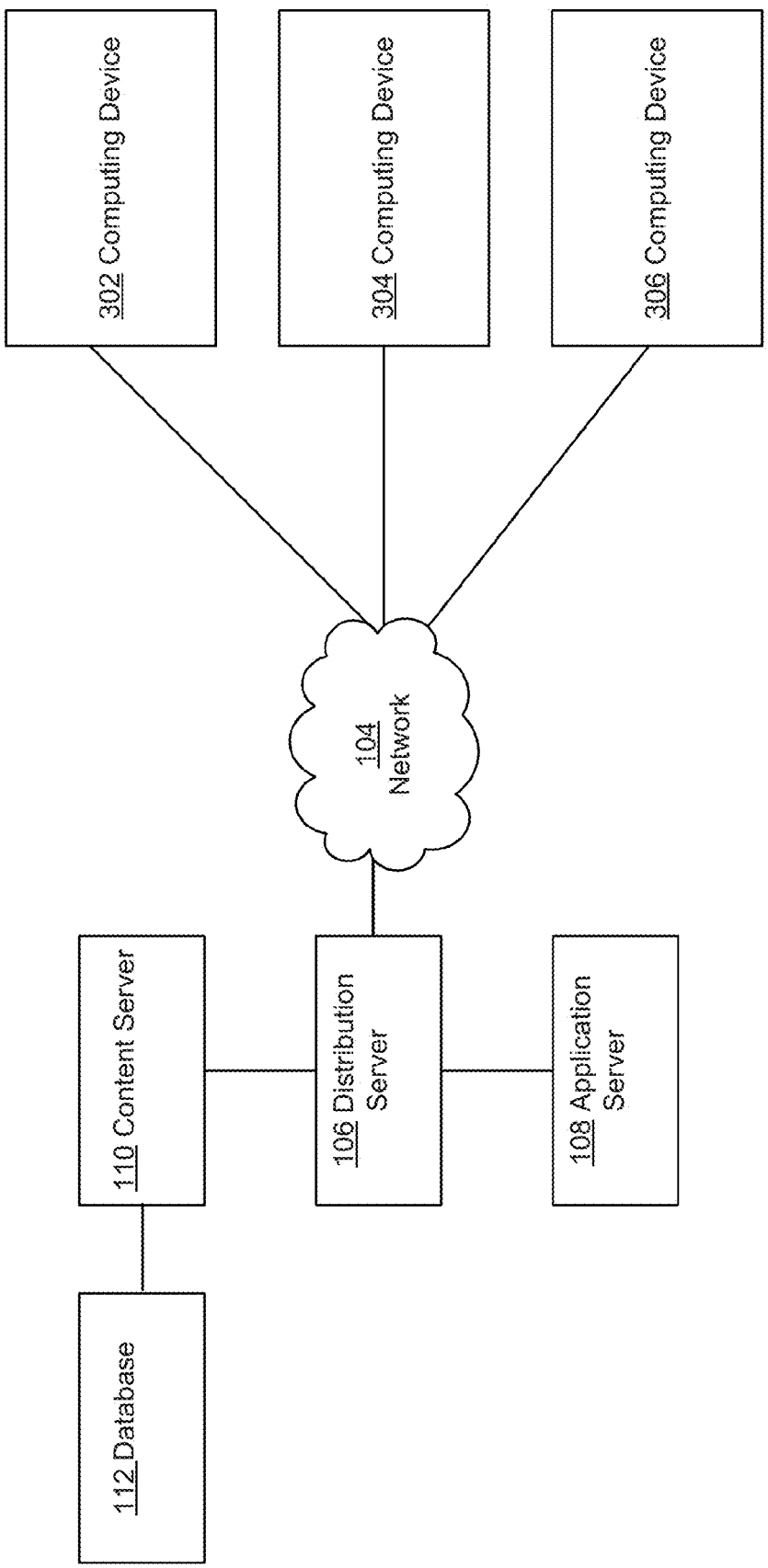
FIG. 3 is a block diagram depicting an exemplary system for implementing visually forming relationships between electronic content.

FIG. 3 is a block diagram depicting an exemplary system for implementing visually forming relationships between electronic content. As illustrated, the exemplary system 300 may include computing devices 302, 304 and 306 that are in communication with one or more network servers (e.g., distribution server 106, application server 108, content server 110) through a network 104 (e.g. the Internet or a private network, etc.). In this embodiment, each of the computing devices 302, 304 and 306 is associated with a user. The computing device 302 is associated with a particular user and computing devices 304 and 306 are associated with one or more different users of computing devices. The computing devices 302, 304 and 306 may view the same or similar content on a graphical user interface. Each computing device may use the content relationship application and perform the functions of the content relationship application.

A user of a computing device 302, 304, 306 may provide electronic content to be viewed on the computing device. The content relationship application may receive the electronic content. The content relationship application may visually relate the received electronic content with previously received electronic content by applying a relationship hierarchy to one or more identified characteristics of the received electronic content.

In an example, the user of a computing device 302 may provide a video recording of a football game using the content relationship application that is displayed on a user interface. The video recording may be visually related to other video recordings of football on the user interface based on the relationship hierarchy. The visual relation of the video recordings may be visible to the users of computing devices 302, 304 and 306. The user of computing device 306 may decide to provide a photograph of a soccer game. The soccer game photograph may be visually related to other electronic content within the same location as the photograph on the user interface based on the relationship hierarchy. The visual relation of the soccer game photograph with the other electronic content within the same location may be visible to the users of computing devices 302, 304 and 306.

Figure 4:
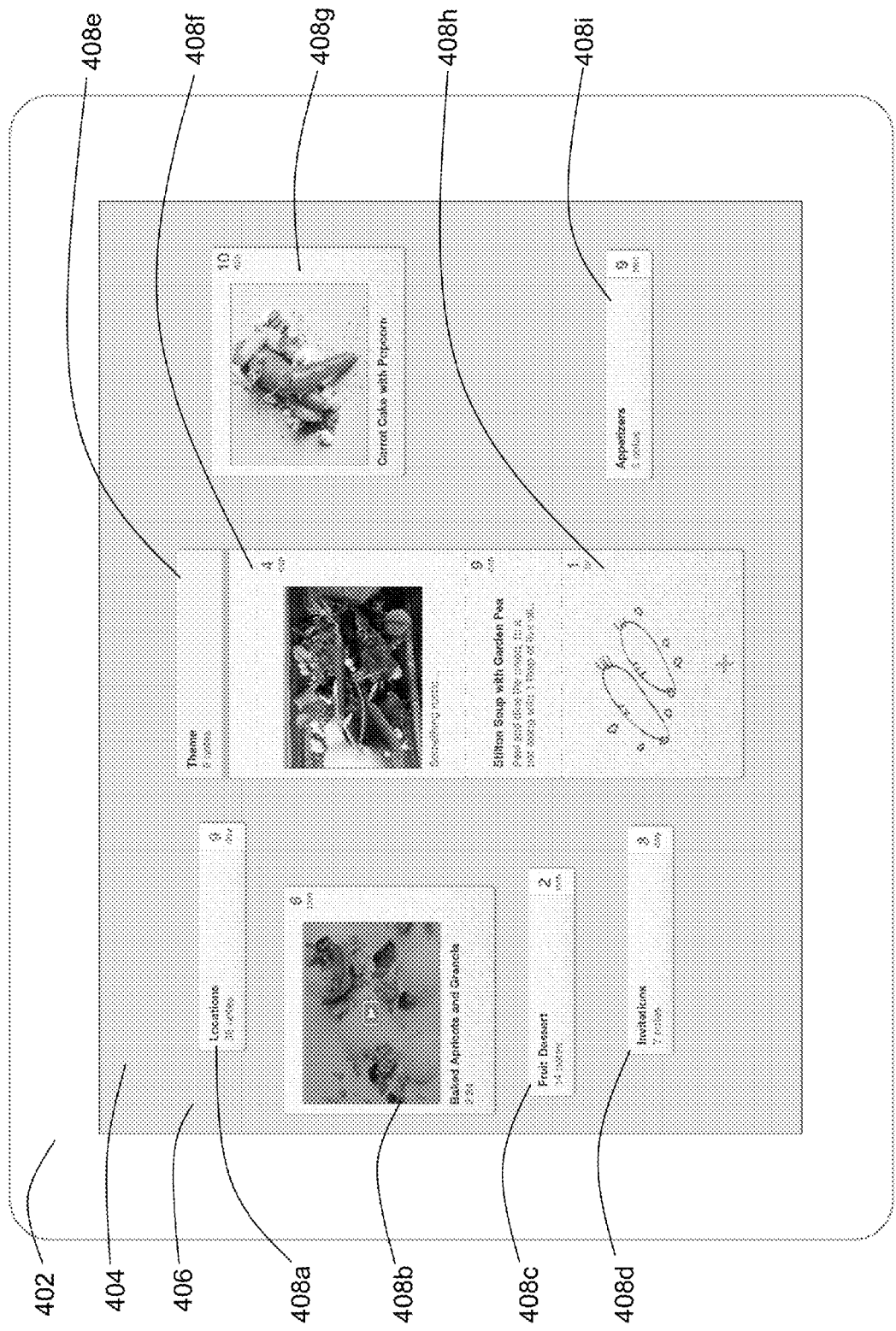
FIG. 4 is an illustration depicting an exemplary user interface for a content relationship application.

FIG. 4 is an illustration depicting an exemplary user interface for a content relationship application. As illustrated in FIG. 4, the computing device 402 may have a display 404. The display 404 may have a user interface 406. The user interface 406 may be a user interface of the content relationship application. The user interface 406 may be used to display electronic content 408a-408i. The electronic content 408a-408i may include received electronic content and/or previously received electronic content. For example, electronic content of a location 408a may be displayed on the user interface 406. The electronic content of a location 408a may have electronic content to 38 notes visually related on the user interface 406. The user interface 406 may visually relate received electronic content and previously received electronic content. For example, electronic content of a theme 408e may be visually related with electronic content of a photograph 408f and electronic content of a drawing 408h.

Figure 5:
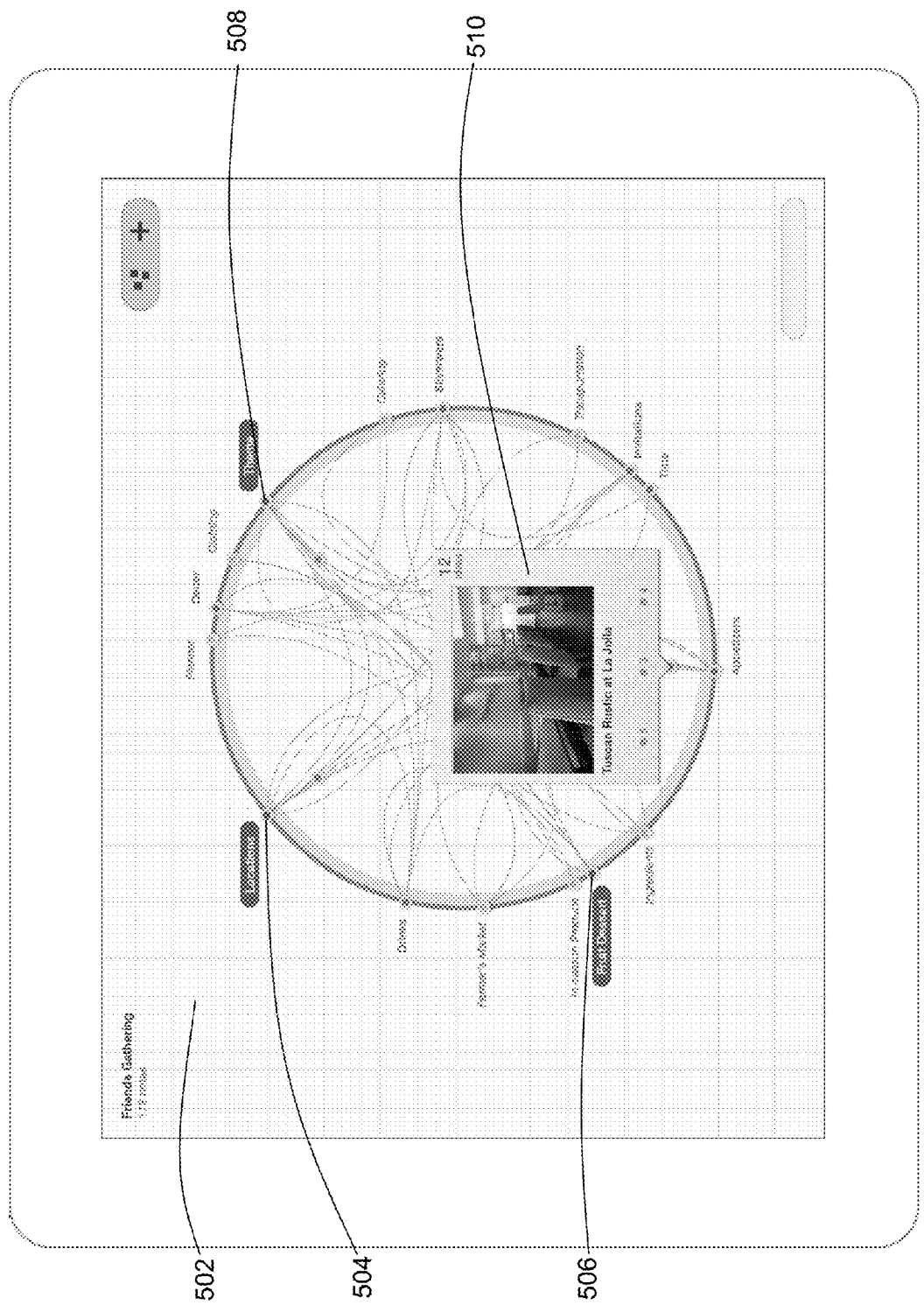
FIG. 5 is an illustration depicting an exemplary user interface for a content relationship application.

FIG. 5 is an illustration depicting an exemplary user interface for a content relationship application. As illustrated in FIG. 5, the user interface 502 may be a user interface of the content relationship application. The user interface 502 may illustrate relationships between electronic content. For example, locations 504, fruit dessert 506, and theme 508 may include related electronic content. The various lines connecting categories of electronic content may be used to illustrate the relationship between the categories of electronic content. The dots may be used to represent the electronic content associated with a particular category of electronic content. For example, the electronic content of 510 is represented by a dot and connected to a category of electronic content for appetizers. The electronic content and/or categories of electronic content may be represented using any shape, representation, and the like.

Figure 6:
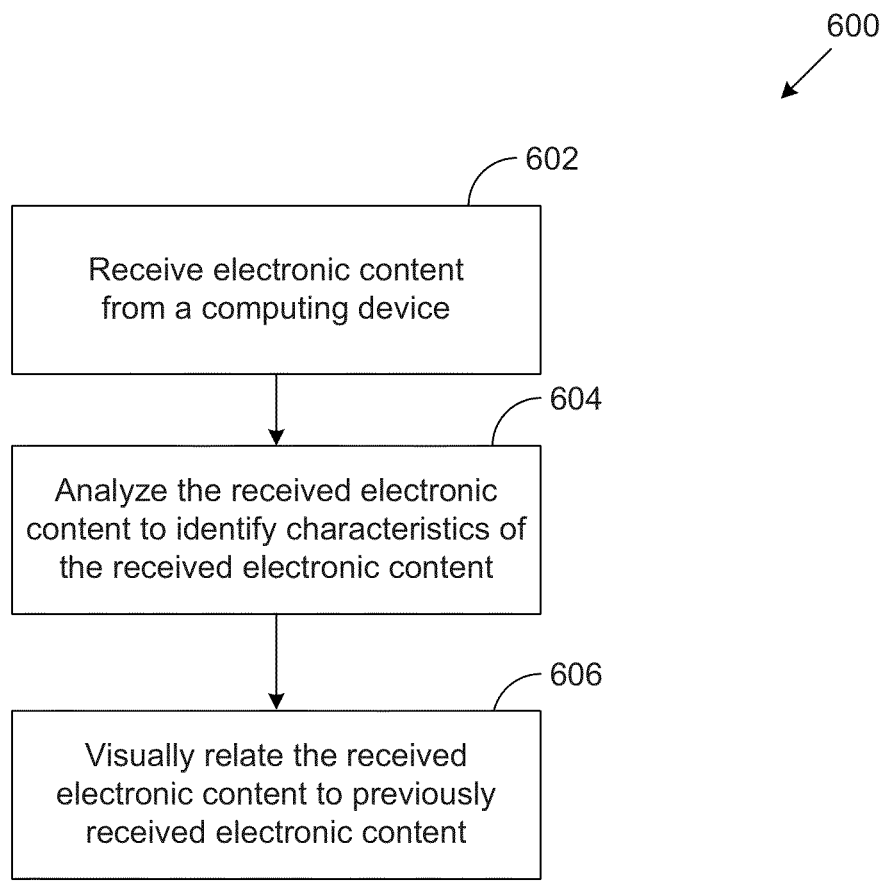
FIG. 6 is a flow chart illustrating an exemplary method of visually forming relationships between electronic content.

FIG. 6 is a flow chart illustrating an exemplary method of visually forming relationships between electronic content. At block 602, electronic content from a user of a computing device is received. The received electronic content can be displayed on a graphical user interface. The graphical user interface may be a user interface of a content relationship application. The electronic content may be received by the user interacting with the user interface of the content relationship application. In some embodiments, the electronic content may be received from one or more users of one or more computing devices.

At block 604, the received electronic content is analyzed to identify characteristics of the received electronic content. The content sharing application may analyze the electronic content to identify one or more characteristics. The one or more identified characteristics may be provided by one or more users of one or more computing devices. The identified characteristics may be extracted from the received electronic content. The content relationship application extracts the identified characteristics from the received electronic content. The content relationship application may obtain the identified characteristics from the received electronic content.

At block 606, received electronic content is visually related to previously received electronic content. The received electronic content may be visually related to previously received electronic content by applying a relationship hierarchy to the identified characteristics of the received electronic content. The received electronic content may be visually related to previously received electronic content on a graphical user interface. The received electronic content may be visually related to previously received electronic content on a graphical user interface of the content relationship application.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. In a computing environment containing electronic content items, a computer-implemented method for identifying and graphically depicting relationships between electronic content items, the method comprising:
   receiving electronic content comprised of at least one item;
   analyzing the received electronic content to identify characteristics of the received electronic content;
   applying a relationship hierarchy, the relationship hierarchy ranking characteristics for determining relationships between electronic content items, wherein a first characteristic is ranked above a second characteristic in the relationship hierarchy;
   determining, by a processor, relationships between the received electronic content and electronic content items previously received from multiple users using multiple computing devices, wherein the received electronic content is determined to be more closely related to a first previously-received electronic content item with which it shares the first characteristic than to a second previously-received electronic content item with which it shares the second characteristic, based on the relationship hierarchy ranking of the first characteristic above the second characteristic; and
   providing for display, on graphical user interfaces of multiple computing devices, a combination of the received and previously-received electronic content items, and graphics identifying the relationships between the received electronic content and the previously-received electronic content items, wherein the graphics depict that the received electronic content is more closely related to the first previously-received electronic content item than to the second previously-received electronic content item, and wherein the graphics permit multiple users of the multiple computing devices to collaborate using the combination and identified relationships.

2. The computer-implemented method of claim 1, wherein the relationships are provided for display simultaneously on multiple computing devices.

3. The computer-implemented method of claim 1, wherein the relationship hierarchy is modified based on input received from multiple computing devices.

4. The computer-implemented method of claim 1, wherein the identified characteristics comprise at least one of:
   a rating;
   a manual grouping;
   metadata associated with the received electronic content;
   a location associated with the received electronic content;
   a time associated with the received electronic content; and
   a type of the received electronic content.

5. The computer-implemented method of claim 1, wherein the identified characteristic is a type of received electronic content comprising at least one of an image, video, audio, text and drawing.

6. The computer-implemented method of clam 1, wherein the relationship hierarchy ranking of the identified characteristics is defined based on received input at a computing device.

7. In a computing environment containing electronic content items, a non-transitory computer-readable medium on which is encoded program code, the program code comprising:
- program code for receiving electronic content comprised of at least one item;
- program code for analyzing the received electronic content to identify characteristics of the received electronic content;
- program code for applying a relationship hierarchy, the relationship hierarchy ranking characteristics for determining relationships between electronic content items, wherein a first characteristic is ranked above a second characteristic in the relationship hierarchy;
- program code for determining relationships between the received electronic content and electronic content items previously received from multiple users using multiple computing devices, wherein the received electronic content is determined to be more closely related to a first previously-received electronic content item with which it shares the first characteristic than to a second previously-received electronic content item with which it shares the second characteristic, based on the relationship hierarchy ranking of the first characteristic above the second characteristic; and
- program code for providing for display, on graphical user interfaces of multiple computing devices, a combination of the received and previously-received electronic content items, and graphics identifying the relationships between the received electronic content and the previously-received electronic content items, wherein the graphics depict that the received electronic content is more closely related to the first previously-received electronic content item than to the second previously-received electronic content item, and wherein the graphics permit multiple users of the multiple computing devices to collaborate using the combination and identified relationships.

8. The non-transitory computer-readable medium of claim 7, wherein the encoded program code further comprises: program code for providing for display the relationships simultaneously on multiple computing devices.

9. The non-transitory computer-readable medium of claim 7, wherein the encoded program code further comprises: program code for modifying the relationship hierarchy based on input received from multiple computing devices.

10. The non-transitory computer-readable medium of claim 7, wherein the identified characteristics comprise at least one of:
- a rating;
- a manual grouping;
- metadata associated with the received electronic content;
- a location associated with the received electronic content;
- a time associated with the received electronic content; and
- a type of the received electronic content.

11. The non-transitory computer-readable medium of claim 7, wherein the identified characteristic is a type of received electronic content comprising at least one of an image, video, audio, text and drawing.

12. The non-transitory computer-readable medium of clam 7, wherein the relationship hierarchy ranking of the identified characteristics is defined based on received input at a computing device.

13. A system comprising:
- a computer-readable medium;
- a graphical user interface;
- a memory medium containing electronic content items; and
- a processor in communication with the computer-readable medium, graphical user interface, and memory medium, the processor configured to:
  - receive electronic content comprised of at least one item;
  - analyze the received electronic content to identify characteristics of the received electronic content;
  - apply a relationship hierarchy, the relationship hierarchy ranking characteristics for determining relationships between electronic content items, wherein a first characteristic is ranked above a second characteristic in the relationship hierarchy;
  - determine relationships between the received electronic content and electronic content items previously received from multiple users using multiple computing devices, wherein the received electronic content is determined to be more closely related to a first previously-received electronic content item with which it shares the first characteristic than to a second previously-received electronic content item with which it shares the second characteristic, based on the relationship hierarchy ranking of the first characteristic above the second characteristic; and
  - provide for display, on graphical user interfaces of multiple computing devices, a combination of the received and previously-received electronic content items, and graphics identifying the relationships between the received electronic content and the previously-received electronic content items, wherein the graphics depict that the received electronic content is more closely related to the first previously-received electronic content item than to the second previously-received electronic content item, and wherein the graphics permit multiple users of the multiple computing devices to collaborate using the combination and identified relationships.

14. The system of claim 13, wherein the graphics identifying the determined relationships between the electronic content provided by the different users are provided for display on the multiple devices simultaneously.

15. The system of claim 13, wherein the processor is further configured to modify the relationship hierarchy based on input received from multiple computing devices.

16. The system of claim 13, wherein the identified characteristics comprise at least one of:
- a rating;
- a manual grouping;
- metadata associated with the received electronic content;
- a location associated with the received electronic content;
- a time associated with the received electronic content; and
- a type of the received electronic content.

17. The system of claim 13, wherein the identified characteristics is a type of received electronic content comprising at least one of an image, video, audio, text and drawing.

18. The system of claim 13, wherein the relationship hierarchy ranking of the identified characteristics is defined based on received input at a computing device.

* * * * *